United States Patent
Cannon et al.

(10) Patent No.: US 6,393,272 B1
(45) Date of Patent: May 21, 2002

(54) WIRELESS ANSWER AND HOLD FEATURE

(75) Inventors: Joseph M. Cannon, Harleysville; Philip D. Mooney, North Wales, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/324,482

(22) Filed: Jun. 2, 1999

(51) Int. Cl.[7] .............................................. H04M 11/10
(52) U.S. Cl. .................... 455/413; 455/415; 379/88.18; 379/88.19
(58) Field of Search ................................ 455/412, 413, 455/414, 415, 417; 379/88.18, 88.19, 88.2, 88.21, 88.23, 211.01, 215.01, 142.01

(56) References Cited

U.S. PATENT DOCUMENTS

| | | | | |
|---|---|---|---|---|
| 5,542,103 A | * | 7/1996 | Mottier et al. ............... | 455/413 |
| 5,559,860 A | * | 9/1996 | Mizikovsky ................. | 455/413 |
| 5,657,372 A | * | 8/1997 | Ahlberg et al. .............. | 455/414 |
| 6,160,877 A | * | 12/2000 | Tatchell et al. .............. | 379/215 |
| 6,198,916 B1 | * | 3/2001 | Martin et al. ................ | 455/413 |

\* cited by examiner

*Primary Examiner*—Dwayne Bost
*Assistant Examiner*—Quochien B. Vuong
(74) *Attorney, Agent, or Firm*—William H. Bollman

(57) ABSTRACT

In one embodiment according to the invention, a telephone includes an answer and hold feature, whereby, in response to a user input, the telephone answers an incoming call, issues an outgoing greeting and maintains a connection status. Thus, the called party can unobtrusively cause the call to be held in the connected status until a time when the called party can conveniently enter into a conversation. For example, a wireless telephone according to the invention may include a controller, a user input unit, and an outgoing message unit. The controller may be adapted to cause the outgoing message unit to output a particular outgoing message in response to an incoming call and a particular indication from the user input unit. The controller may be further adapted to maintain a connection status of the incoming call so that a user can communicate at a point in time subsequent to the initiation of the outgoing message. In another embodiment according to the invention, a method of handling an incoming call in a wireless telephone includes the steps of providing an indication of the incoming call, receiving a particular user input, outputting a particular outgoing message in response to the particular user input, and maintaining a connection status of the incoming call.

10 Claims, 3 Drawing Sheets

WIRELESS ANSWER AND HOLD FEATURE

FIELD OF THE INVENTION

The invention is directed to the field of telephony, and more particularly, wireless telephony, such as cellular telephones.

BACKGROUND OF THE INVENTION

Wireless telephones are increasing in popularity. In some cultures, such as the global business culture, virtually everyone has a wireless telephone. It is common to be involved in a business meeting and hear the ring of a wireless telephone, at which time the recipient of the incoming telephone call excuses herself and answers the incoming telephone call. When she completes the incoming telephone call, perhaps by simply telling the incoming caller that she will call the incoming caller back in a few moments at a convenient time, the recipient of the incoming call returns to the meeting. However, the incoming call has a negative effect on the on-going meeting, in that it causes a temporary interruption and delay in the progress of the meeting. If such interruptions occur frequently, or at inopportune times, they can be very disruptive to the meeting and annoy the participants.

The recipient of the incoming call may alternatively elect not to answer the incoming call, so as to keep the interruption of the on-going meeting to a minimum. Typically, the incoming call will then be forwarded to a central voicemail system and the incoming caller will be given the opportunity to leave a message. This alternative is not perfect, in that the incoming call may still ring on the recipient's telephone for a predetermined number (i.e., 4) of times, so that the meeting is still disturbed, and the incoming caller is inconvenienced in that he now is limited to leaving a voicemail message. Further, this option may cause the recipient to miss an important telephone call.

A system is needed whereby a wireless telephone user can minimize the inconvenience to an incoming caller, while also minimizing the disruptive effect that an incoming call has on an on-going meeting.

SUMMARY OF THE INVENTION

In one embodiment according to the invention, a telephone includes an answer and hold feature, whereby, in response to a user input, the telephone answers an incoming call, issues an outgoing greeting and maintains a connection status. Thus, the called party can unobtrusively cause the call to be held in the connected status until a time when the called party can conveniently enter into a conversation.

For example, a wireless telephone according to the invention may include a controller, a user input unit, and an outgoing message unit. The controller may be adapted to cause the outgoing message unit to output a particular outgoing message in response to an incoming call and a particular indication from the user input unit. The controller may be further adapted to maintain a connection status of the incoming call so that a user can communicate at a point in time subsequent to the initiation of the outgoing message.

In another embodiment according to the invention, a method of handling an incoming call in a wireless telephone includes the steps of providing an indication of the incoming call, receiving a particular user input, outputting a particular outgoing message in response to the particular user input, and maintaining a connection status of the incoming call.

BRIEF DESCRIPTION OF THE DRAWINGS

These and other advantages of the invention will be apparent to one of skill in the art upon review of the following detailed description in light of the drawings, wherein.

DETAILED DESCRIPTION

Figures 1, 2:
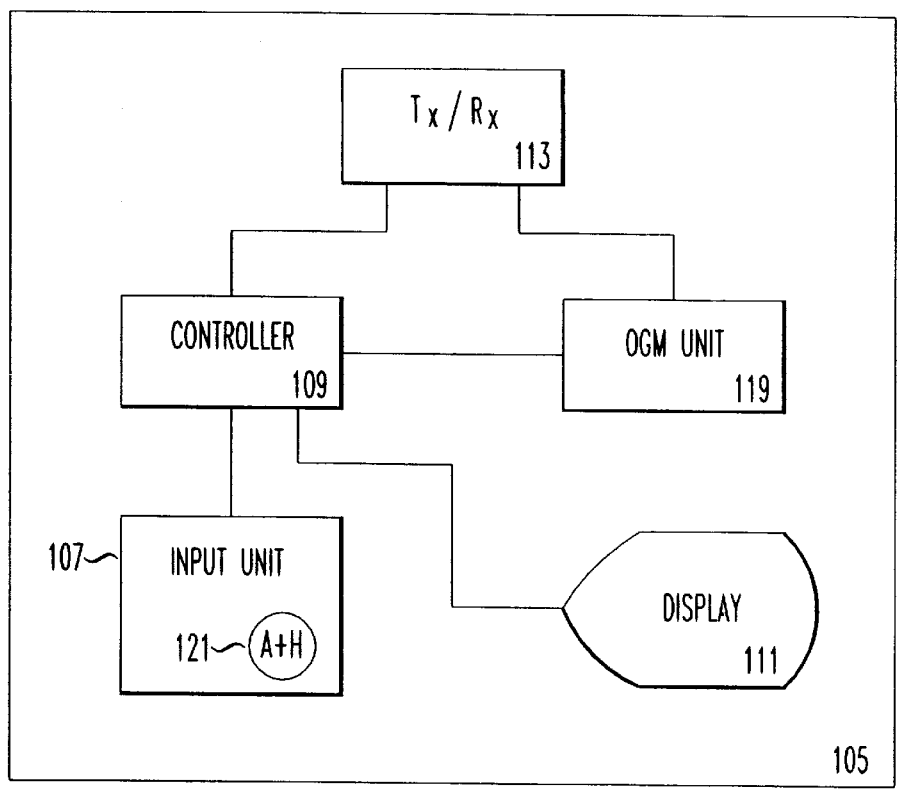
FIG. 1 is a simplified block diagram of an exemplary telephone according to the invention.
FIG. 2 is a simplified representation of a portion of the telephone depicted in FIG. 1.

FIG. 1 is a simplified block diagram of a telephone 105 according to the invention. In this exemplary embodiment, telephone 105 is depicted as a wireless telephone, such as a cellular telephone. Telephone 105 includes conventional cellular telephone features, such as an input unit 107, a controller (such as a microcontroller, digital signal processor, etc.) 109, a display 111, an RF transmitter/receiver 113, and an antenna 117.

Telephone 105 also includes an outgoing message unit 119, and user input unit 107 further includes an Answer & Hold input element 121. Operationally, controller 109 will respond to a signal from Answer & Hold input element 121 of input unit 107 to answer an incoming call, cause the outgoing message unit 119 to output a particular outgoing message, and maintain a connection status of the incoming call. The incoming caller will thus be alerted by the outgoing message, and can remain on the connected call to wait to speak to the user.

FIG. 2 shows a keypad as an exemplary embodiment of input unit 107, including, as a particular key, Answer & Hold input element 121. The remaining keys of the keypad are conventional cellular dialing and function keys. According to this embodiment, when a user is alerted to an incoming call, and the user is constrained because the user does not want the incoming call to proceed directly to voicemail, but the user cannot immediately answer the incoming call, the user activates the Answer & Hold key 121. The outgoing message unit will thus output a message such as "Please hold, I will be with you shortly." The connection will be maintained, and the user will subsequently be able to communicate with the incoming caller when it is convenient to do so.

For example, if the user is driving and would prefer to pull over to the side of the road before talking, the user can press the Answer & Hold button 121. The incoming caller will hear the outgoing message and hopefully stay on the line, and after the user has pulled to the side of the road, the user will be able to enter into a conversation with the incoming caller.

In one embodiment, in conjunction with causing the outgoing message unit 119 to output the outgoing message, the controller 109 will mute any microphone or speaker elements associated with the telephone 105. Thus, the incoming caller will not hear any of the ambient conversation or noise around the user, and the user or those near the user will not hear the outgoing message until the user deactivates the muting function. This is particularly advantageous if the user is in a meeting when the incoming call is received, and the user does not want to disturb the other meeting participants, or does not want the incoming caller to be privy to the activities of the meeting. In such a case, the user activates the Answer & Hold feature, moves to a convenient location, such as outside the meeting room, and then deactivates the muting to begin a conversation.

The muting may be deactivated, for example, by user input to the input unit 107, such as by activating a particular key or set of keys, or by a voice activity detector that senses voice activity sufficiently proximate to a microphone element to conclude that the user is speaking thereinto. For example, the Answer & Hold key may function as a toggle key, with the first press placing the call into a pseudo-hold state by muting the transducers (and also causing the outgoing message to be transmitted). A subsequent press will then re-enable the transducers to terminate the pseudo-hold state and enable normal communication.

The above-described embodiment employs a particular key, in addition to those normally present on a cellular telephone, to activate the Answer & Hold feature. It is, of course, also within the scope of the invention to utilize existing keys, either in combination or in a particular order, to activate this feature. For example, user activation of the "*" key, followed by the "8" key, may activate the Answer & Hold feature. Any key, set of keys, order of keys, or other means of user input is sufficient to activate the Answer & Hold feature according to the invention.

Display 111, which may be a conventional liquid crystal display (LCD) provided on telephone 105 for purposes of providing alphanumerical information to the user, may also be employed to provide the user with status information regarding the Answer & Hold feature. For example, when the Answer & Hold feature is activated, the display 111 can so indicate. The display 111 may also provide notice to the user that the outgoing message is being played and/or notice that the incoming caller is still in the pseudo-hold status (i.e., the incoming caller did not terminate the call). These indicators may, of course, alternatively be provided separate from conventional LCD portions of display 111, such as by one or more light emitting diodes (LEDs).

Controller 109 may additionally be adapted to transfer the incoming call to a conventional voicemail system, based on certain conditions. For example, when the outgoing message is initially output, it may include an additional option such as "if you would like to proceed directly to voicemail, please press #." According to this embodiment, controller 109 would respond to an input # signal by terminating the pseudo-hold status and causing the call to proceed to voicemail. Alternatively, the option to press # to proceed to voicemail may be provided as part of a separate outgoing message, such as, for example, after the passage of a predetermined period of time.

Instead of issuing the option, the controller 109 may alternatively be configured to automatically terminate the pseudo-hold status and cause the incoming call to proceed to voicemail based on the passage of a predetermined amount of time, based on user input, or based on the receipt of another incoming call.

In another alternative embodiment according to the invention, controller 109 may be configured to evaluate call related information, such as Caller ID data, associated with the incoming call, and to base the output of the outgoing message and maintenance of the connection on the call related information. For example, if the user is going to be in an important meeting, the user may configure controller 109 to forward all incoming calls to voicemail, except for calls from the user's boss and/or spouse. For calls with call related information associated with the user's boss or spouse, the controller may be configured to automatically issue the outgoing message while simultaneously alerting the user (such as through a standard vibration alert) to the incoming call. The user can then decide to take the call, by, for example, leaving the meeting and terminating the pseudo-hold state, or the user may alternatively choose to forward the call to voicemail because the meeting is at an important point.

Figure 3:
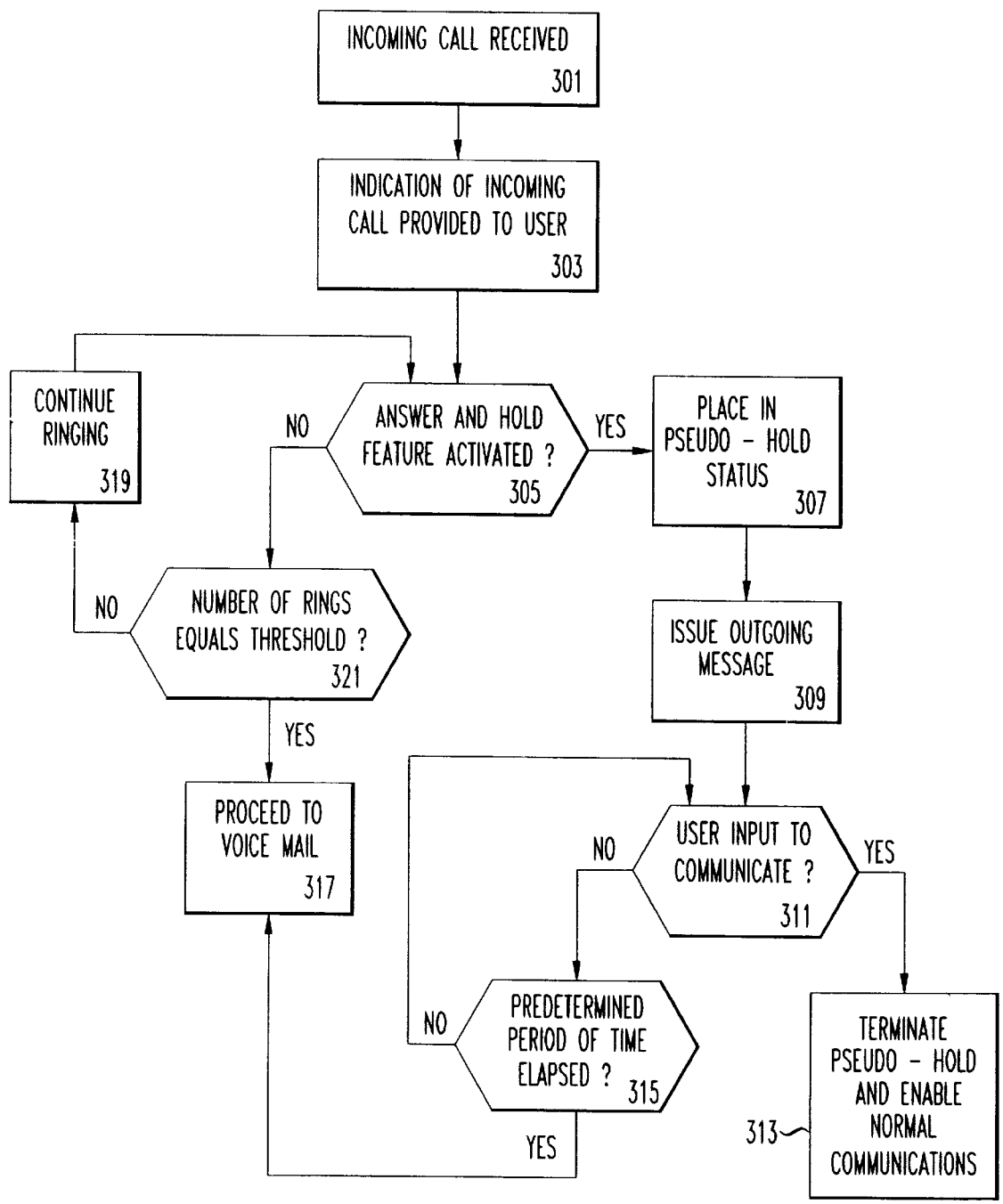
FIG. 3 is an exemplary flowchart of operation of a telephone according to the invention.

FIG. 3 shows an exemplary flowchart of operation according to the invention. At step 301, an incoming call is received. In response to the incoming call, at step 303, controller 109 causes an indication to be provided to the user, such as through a conventional ringing circuit or a conventional vibration element. At step 305, the controller determines if the user activated the Answer & Hold feature, such as by activating Answer & Hold input element 121 of input unit 107. If the answer is YES, then at step 307 the controller 109 places the telephone 105 in a pseudo-hold status and at step 309 the controller 109 causes the outgoing message unit 119 to output the outgoing message. Of course, as discussed earlier, the muting of the transducers to cause the pseudo-hold status is optional, as is the ordering of steps 307 and 309.

After the outgoing message is issued in step 309, the controller proceeds to step 311 to determine if user input to communicate has been received. As discussed earlier, the ordering of step 311 after completion of step 309 is purely by way of example, and not of limitation. Of course, the user input of step 311 may alternatively be received during the issuance of outgoing message 311, in which case the system can proceed directly to step 313. In any event, upon receipt of the user input at step 311, the pseudo-hold status is terminated and normal communications proceed at step 313.

The form of user input at step 311 may be, for example, the activation of a particular portion of input unit 107, such as the toggling of Answer & Hold input element 121. Alternatively, the user input may be voice input sensed, for example, by a voice activity detection unit that may be configured as a functional block within a DSP comprising controller 109 and receiving digital signals from a microphone and CODEC (analog-to-digital converter) associated with telephone 105.

If the user input is not sensed at step 311, the system proceeds to step 315 to determine if a predetermined period of time has elapsed. If so, the system may proceed to voicemail at step 317, and if not the system will continue to await user input at step 311. Of course, the use of a time threshold is merely by way of example and not of limitation, as is the transition to voicemail. Alternatively, the system may be configured to await user input indefinitely, or until alternative user input is received. Exemplary periods of time for use in step 315 may be on the order of one minute, two minutes, or five minutes, with the actual amount of time potentially being user programmable and/or varying depending on the call related information associated with the incoming call.

If the answer at step 305 is NO, indicating that the Answer & Hold feature has not been activated, the system can proceed in a normal fashion, wherein it will continue to ring (or vibrate) according to step 319 until the number of rings equals a threshold (e.g. four) at step 321 or the Answer & Hold feature is activated at step 305. When the number of rings equals the threshold at step 321, the system proceeds to voicemail at step 317.

Controller 109 and OGM unit 119 may be configured as integrated circuit elements, either separately, or in combination, and may further be configured with a memory and interfaces to display 111, RF transmitter/receiver 113 and input unit 121. Such an integrated circuit may further include interface elements, such as a CODEC, to interface with transducers such as a microphone and speaker associated with telephone 105. A programmable DSP, such as one of the DSP 16XXX series available from Lucent Technologies, Inc., may be readily adapted for such use by one of skill in the art upon an understanding of the present teaching.

The aforementioned embodiments describe the invention embodied entirely within telephone 105. Alternatively, some or all of the novel functionality associated with the invention may be provided at a base station associated with telephone 105 (where the "association" need not be permanent, but may be just for a portion or all of a current telephone call). Further, the functionality may be provided as part of a service at a central location associated with or including one or more base stations.

For example, OGM unit 119 need not be contained within telephone 105, but may, according to an alternative embodiment, be controlled by a service provider at a central location. Accordingly, the service provider can receive a signal from telephone 105 indicating that the user activated Answer & Hold input element 121, and can then cause the proper outgoing greeting to be transmitted to the incoming caller, while the service provider maintains the connection status. The only necessary modifications to telephone 105 according to this embodiment are an embodiment of Answer & Hold input element 121 (single button, separate button, voice activity, etc.), and an output signal to inform the service provider of the activation. Additional modifications may include functionality in microcontroller 109 to receive signals from the service provider and to provide associated indicia to the user.

Figure 4:
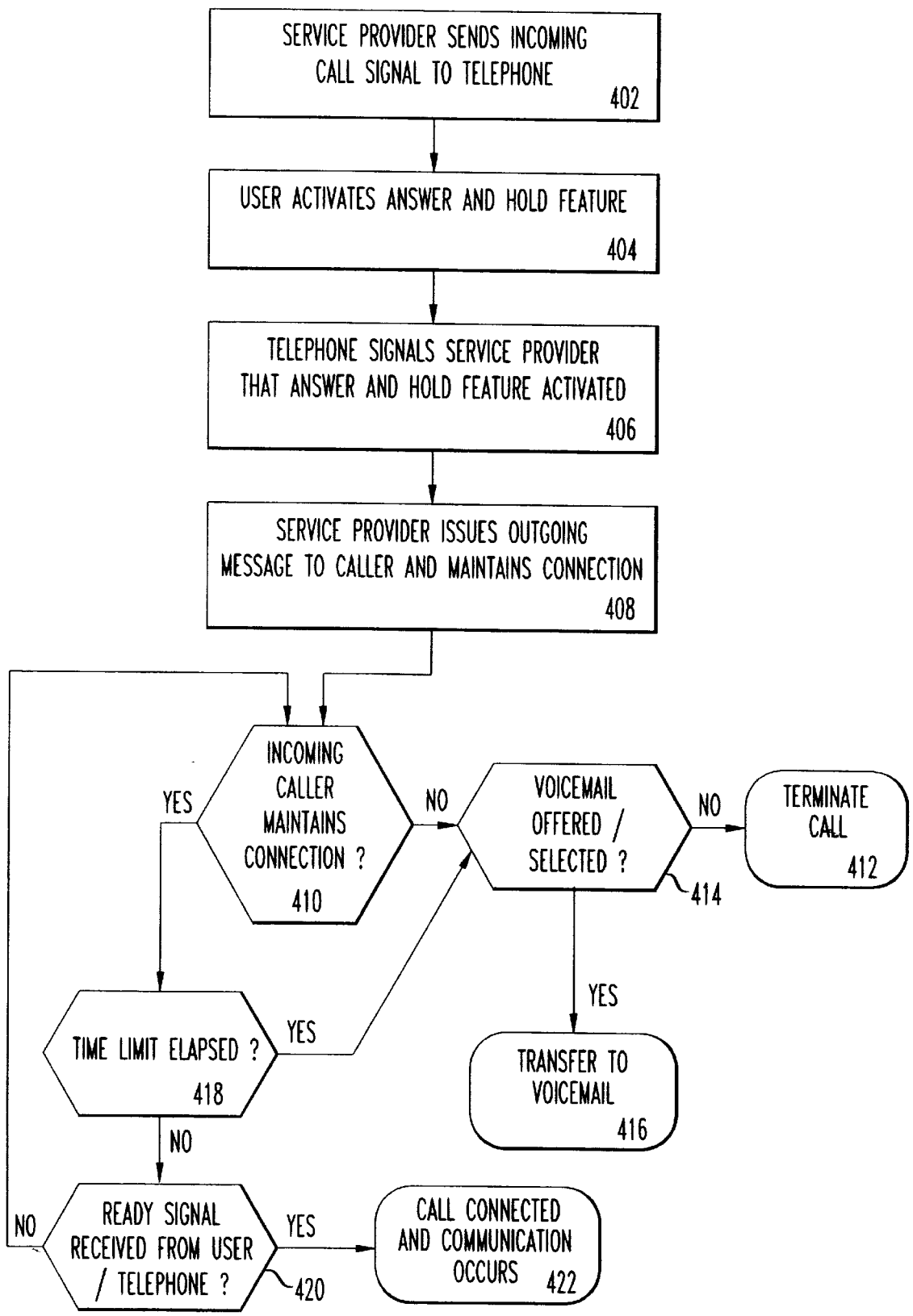
FIG. 4 is an exemplary flowchart of operation of a service provider-based embodiment of the invention.

FIG. 4 is an exemplary flowchart of a service provider-based process. At step 402, the service provider signals the user's telephone to inform the user that an incoming call is available. This information may simply be a ringing signal, which causes the user's phone to ring or vibrate, or may additionally include caller ID data associated with the incoming caller. Further, the service provider may have analyzed the Caller ID data associated with the incoming caller and may have thus enabled the Answer & Hold feature based thereon. The information provided to the user's telephone may include an indication of this fact.

At step 404, if the user chooses to do so, the Answer & Hold feature is activated at the user's phone, and the user's phone provides an Answer & Hold signal to the service provider at step 406. In response to this signal, the service provider issues the outgoing message to the incoming caller and maintains a connection status of the incoming call at step 408. The outgoing message may also include an option for the incoming caller to transfer to the voicemail system. Further, the outgoing message may be stored by the service provider in a memory that also is used for storing conventional voicemail outgoing messages.

If the incoming caller desires to wait to speak with the user in response to the Answer & Hold outgoing message, then the incoming caller maintains the connection at step 410. If not, then the call is terminated (step 412) unless voicemail was offered and/or selected (step 414), in which case the service provider transfers the incoming caller to voicemail (step 416).

As with the telephone based system described earlier, the service provider-based system may employ a time threshold (either fixed or variable, and potentially Caller ID dependent). If so, a determination is made at step 418 as to whether the time limit has elapsed. If so, the call is either terminated (step 412) or transferred to voicemail (step 416), as appropriate. If not, the service provider awaits a ready signal from the user's telephone at step 420. The ready signal may be enabled by the user, for example, by toggling the Answer & Hold input element 121, such that the second reception of this signal is interpreted as the ready signal. Various alternative arrangements are of course available, such as use of a "Send" key or "Talk" key as a means of initiating the ready signal. When the ready signal is received, the call is connected at step 422 and communication can commence.

Various embodiments of the invention having been disclosed to enable a user of a telephone, such as a wireless telephone, to handle an incoming telephone call in a convenient manner when it is inconvenient to immediately answer the call and begin talking. Given this description, other obvious variations of the invention will undoubtedly suggest themselves to one of skill in the art, and these variations are, of course, included within the scope of the invention.

What is claimed is:

1. A wireless telephone comprising:

a controller;

a user input unit; and an outgoing message unit, wherein the controller is adapted to cause the outgoing message unit to output a particular outgoing message in response to an incoming call and a particular indication from the user input unit, wherein the controller is adapted to maintain a connection status of the incoming call so that a user can communicate at a point in time subsequent to the initiation of the outgoing message, and wherein the controller is further adapted to transfer the incoming call to a voicemail system based on receipt of another incoming call.

2. A wireless telephone as recited in claim 1, wherein the user input unit comprises a button.

3. A wireless telephone as recited in claim 2, wherein the button is part of a keypad.

4. A wireless telephone as recited in claim 1, wherein the wireless telephone is a cellular telephone.

5. A wireless telephone as recited in claim 1, wherein the transfer to the voicemail system is based on user input.

6. A wireless telephone as recited in claim 1, wherein the transfer of the voicemail system is based on the passage of a predetermined amount of time since the output of the particular outgoing message.

7. A wireless telephone as recited in claim 1, wherein the transfer to the voicemail system is based on an input from an incoming caller.

8. A wireless telephone as recited in claim 7, wherein the input from the incoming caller is preceded by another particular outgoing message.

9. A wireless telephone as recited in claim 1, wherein the controller is further adapted to evaluate call related information associated with the incoming call, and wherein the output of the particular outgoing message and the maintenance of the connection are based on the call related information.

10. A wireless telephone as recited in claim 9, wherein the call related information comprises Caller ID data.

* * * * *